US011277783B2

(12) United States Patent
Luo et al.

(10) Patent No.: US 11,277,783 B2
(45) Date of Patent: Mar. 15, 2022

(54) LOW LATENCY RELAYING OF A NOTIFICATION SIGNAL IN AN INTEGRATED ACCESS AND BACKHAUL NETWORK

(71) Applicant: QUALCOMM Incorporated, San Diego, CA (US)

(72) Inventors: Jianghong Luo, Skillman, NJ (US); Navid Abedini, Somerset, NJ (US); Junyi Li, Chester, NJ (US); Tao Luo, San Diego, CA (US); Luca Blessent, Whitehouse Station, NJ (US); Karl Georg Hampel, Hoboken, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 9 days.

(21) Appl. No.: 16/829,727

(22) Filed: Mar. 25, 2020

(65) Prior Publication Data

US 2020/0351753 A1 Nov. 5, 2020

Related U.S. Application Data

(60) Provisional application No. 62/841,611, filed on May 1, 2019.

(51) Int. Cl.
*H04W 56/00* (2009.01)
*H04L 5/00* (2006.01)
(Continued)

(52) U.S. Cl.
CPC ......... *H04W 40/248* (2013.01); *H04W 24/08* (2013.01); *H04W 68/005* (2013.01); *H04W 84/18* (2013.01)

(58) Field of Classification Search
None
See application file for complete search history.

(56) References Cited

U.S. PATENT DOCUMENTS

| 2018/0124718 A1* | 5/2018 | Ng et al. ............. H04W 56/001 |
| 2019/0043369 A1 | 2/2019 | Miller et al. |
| 2019/0075571 A1 | 3/2019 | Abedini et al. |

FOREIGN PATENT DOCUMENTS

WO 2019002073 A1 1/2019

OTHER PUBLICATIONS

International Search Report and Written Opinion—PCT/US2020/024928—ISA/EPO—dated Jul. 20, 2020.
(Continued)

*Primary Examiner* — Gary Lafontant
(74) *Attorney, Agent, or Firm* — Harrity & Harrity, LLP

(57) ABSTRACT

Various aspects of the present disclosure generally relate to wireless communication. In some aspects, a node in a multi-hop network may receive a configuration for a notification signal, wherein the configuration indicates a receive (RX) resource to be used by the node to monitor for the notification signal and a transmit (TX) resource to be used by the node to transmit the notification signal, wherein the RX resource and the TX resource are included in a time period that also includes one or more other RX resources and one or more other TX resources to be used by one or more other nodes in the multi-hop network for the notification signal. The node in a multi-hop network may refrain from transmitting or receiving in any resources within the time period except for the RX resource and the TX resource. Numerous other aspects are provided.

28 Claims, 9 Drawing Sheets

(51) Int. Cl.
    *H04W 40/24* (2009.01)
    *H04W 24/08* (2009.01)
    *H04W 68/00* (2009.01)
    *H04W 84/18* (2009.01)

(56) References Cited

OTHER PUBLICATIONS

LG Electronics: "Framework of BH RLF Notification and Recovery", 3GPP Draft, 3GPP TSG-RAN WG2 Meeting #105bis, R2-1905028 Framework of BH RLF Notification and Recovery, 3rd Generation Partnership Project (3GPP), Mobile Competence Centre, 650, Route Des Lucioles, F-06921, Sophia-Antipolis Cedex, France, vol. RAN WG2. No. Xian. China; Apr. 8, 2019-Apr. 12, 2019, Apr. 6, 2019 (Apr. 6, 2019), XP051702306, 6 pages, Retrieved from the Internet: URL: http://www.3gpp.org/ftp/Meetings%5F3GPP%5FSYNC/RAN2/Docs/R2%2D1905028%2Ezip [retrieved on Apr. 6, 2019]2.1 Question 1: When does backhaul RLF Event need to be notified to its childnode?; 2.2 Question 2: When does the recieved BH RLF notification need to further propagate to multo-hop child nodes?; 3 Proposal. incl. Proposals 1-7.
International Search Report and Written Opinion—PCT/US2020/024928—ISA/EPO—dated Jul. 26, 2021.

\* cited by examiner

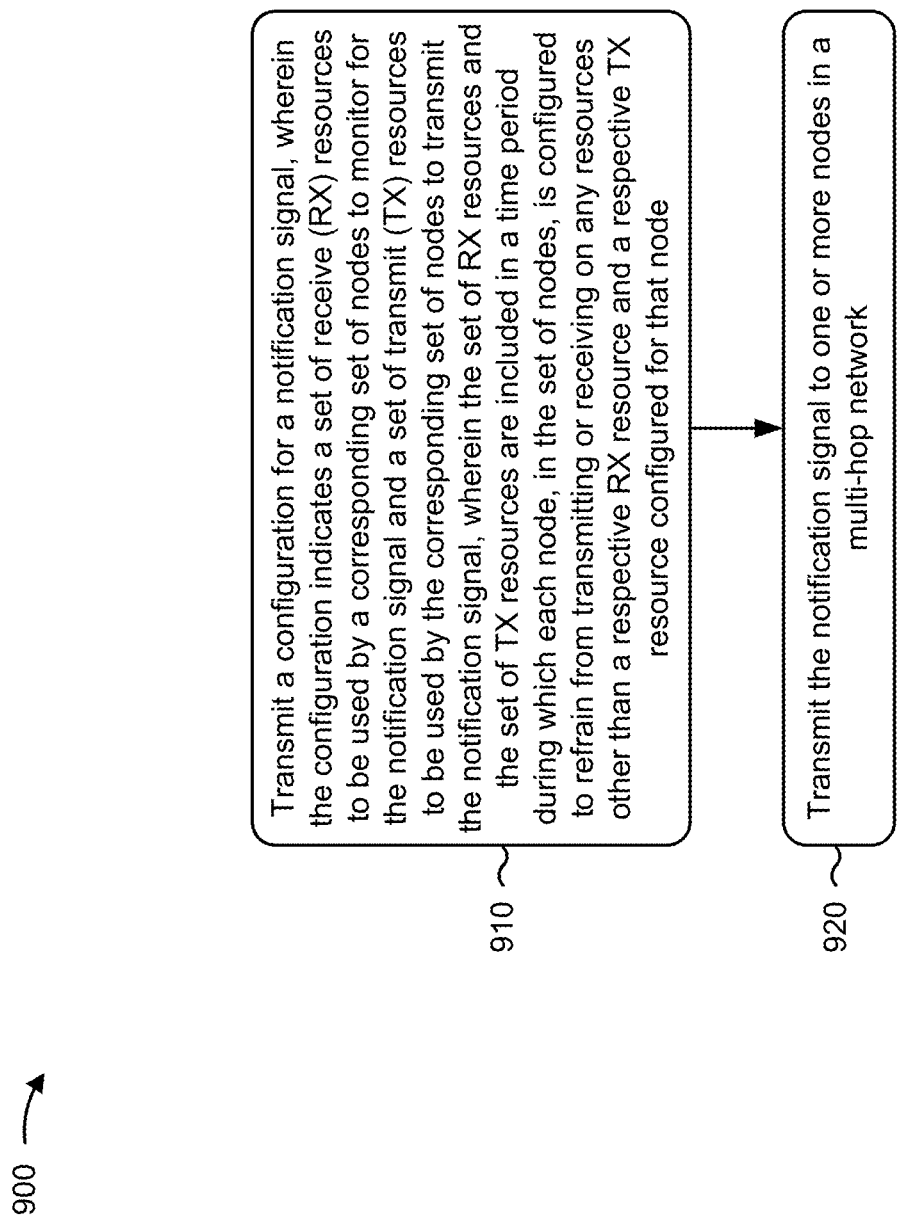

LOW LATENCY RELAYING OF A NOTIFICATION SIGNAL IN AN INTEGRATED ACCESS AND BACKHAUL NETWORK

CROSS-REFERENCE TO RELATED APPLICATION

This Patent Application claims priority to U.S. Provisional Patent Application No. 62/841,611, filed on May 1, 2019, entitled "LOW LATENCY RELAYING OF A NOTIFICATION SIGNAL IN AN INTEGRATED ACCESS AND BACKHAUL NETWORK," and assigned to the assignee hereof. The disclosure of the prior Application is considered part of and is incorporated by reference in this Patent Application.

FIELD OF THE DISCLOSURE

Aspects of the present disclosure generally relate to wireless communication and to techniques and apparatuses for low latency relaying of a notification signal in an integrated access and backhaul (IAB) network.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a node in a multi-hop network, may include receiving a configuration for a notification signal, wherein the configuration indicates a receive (RX) resource to be used by the node to monitor for the notification signal and a transmit (TX) resource to be used by the node to transmit the notification signal, wherein the RX resource and the TX resource are included in a time period that also includes one or more other RX resources and one or more other TX resources to be used by one or more other nodes in the multi-hop network for the notification signal; and refraining from transmitting or receiving in any resources within the time period except for the RX resource and the TX resource. In some aspects, the node may receive the notification signal in the RX resource and may transmit the notification signal in the TX resource, wherein the notification signal has a shorter symbol duration than a symbol duration used for communications outside of the time period.

In some aspects, a method of wireless communication, performed by a triggering node in a multi-hop network, may include transmitting a configuration for a notification signal, wherein the configuration indicates a set of RX resources to be used by a corresponding set of nodes to monitor for the notification signal and a set of TX resources to be used by the corresponding set of nodes to transmit the notification signal, wherein the set of RX resources and the set of TX resources are included in a time period during which each node, in the set of nodes, is configured to refrain from transmitting or receiving on any resources other than a respective RX resource and a respective TX resource configured for that node; and transmitting the notification signal to one or more nodes in the multi-hop network.

In some aspects, a node in a multi-hop network for wireless communication may include memory and one or more processors operatively coupled to the memory. The memory and the one or more processors may be configured to receive a configuration for a notification signal, wherein the configuration indicates an RX resource to be used by the node to monitor for the notification signal and a TX resource to be used by the node to transmit the notification signal, wherein the RX resource and the TX resource are included in a time period that also includes one or more other RX resources and one or more other TX resources to be used by one or more other nodes in the multi-hop network for the notification signal; and refrain from transmitting or receiving in any resources within the time period except for the RX resource and the TX resource.

In some aspects, a triggering node in a multi-hop network for wireless communication may include memory and one or more processors operatively coupled to the memory. The memory and the one or more processors may be configured to transmit a configuration for a notification signal, wherein the configuration indicates a set of RX resources to be used by a corresponding set of nodes to monitor for the notification signal and a set of TX resources to be used by the corresponding set of nodes to transmit the notification signal, wherein the set of RX resources and the set of TX resources are included in a time period during which each node, in the set of nodes, is configured to refrain from transmitting or receiving on any resources other than a respective RX resource and a respective TX resource configured for that node; and transmit the notification signal to one or more nodes in the multi-hop network.

In some aspects, a non-transitory computer-readable medium may store one or more instructions for wireless communication. The one or more instructions, when executed by one or more processors of a node in a multi-hop network, may cause the one or more processors to: receive a configuration for a notification signal, wherein the configuration indicates a RX resource to be used by the node to monitor for the notification signal and a TX resource to be used by the node to transmit the notification signal, wherein the RX resource and the TX resource are included in a time period that also includes one or more other RX resources and one or more other TX resources to be used by one or more other nodes in the multi-hop network for the notification signal; and refrain from transmitting or receiving in any resources within the time period except for the RX resource and the TX resource.

In some aspects, a non-transitory computer-readable medium may store one or more instructions for wireless communication. The one or more instructions, when executed by one or more processors of a triggering node in a multi-hop network, may cause the one or more processors to: transmit a configuration for a notification signal, wherein the configuration indicates a set of RX resources to be used by a corresponding set of nodes to monitor for the notification signal and a set of TX resources to be used by the corresponding set of nodes to transmit the notification signal, wherein the set of RX resources and the set of TX resources are included in a time period during which each node, in the set of nodes, is configured to refrain from transmitting or receiving on any resources other than a respective RX resource and a respective TX resource configured for that node; and transmit the notification signal to one or more nodes in the multi-hop network.

In some aspects, an apparatus for wireless communication in a multi-hop network may include means for receiving a configuration for a notification signal, wherein the configuration indicates an RX resource to be used by the apparatus to monitor for the notification signal and a TX resource to be used by the apparatus to transmit the notification signal, wherein the RX resource and the TX resource are included in a time period that also includes one or more other RX resources and one or more other TX resources to be used by one or more other apparatuses in the multi-hop network for the notification signal; and means for refraining from transmitting or receiving in any resources within the time period except for the RX resource and the TX resource.

In some aspects, an apparatus for wireless communication in a multi-hop network may include means for transmitting a configuration for a notification signal, wherein the configuration indicates a set of (RX resources to be used by a corresponding set of nodes to monitor for the notification signal and a set of TX resources to be used by the corresponding set of nodes to transmit the notification signal, wherein the set of RX resources and the set of TX resources are included in a time period during which each node, in the set of nodes, is configured to refrain from transmitting or receiving on any resources other than a respective RX resource and a respective TX resource configured for that node; and means for transmitting the notification signal to one or more nodes in the multi-hop network.

Aspects generally include a method, apparatus, system, computer program product, non-transitory computer-readable medium, user equipment, base station, wireless communication device, node, triggering node, integrated access and backhaul (IAB) donor, IAB node, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 8 and 9 are diagrams illustrating example processes relating to low latency relaying of a notification signal in an IAB network, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
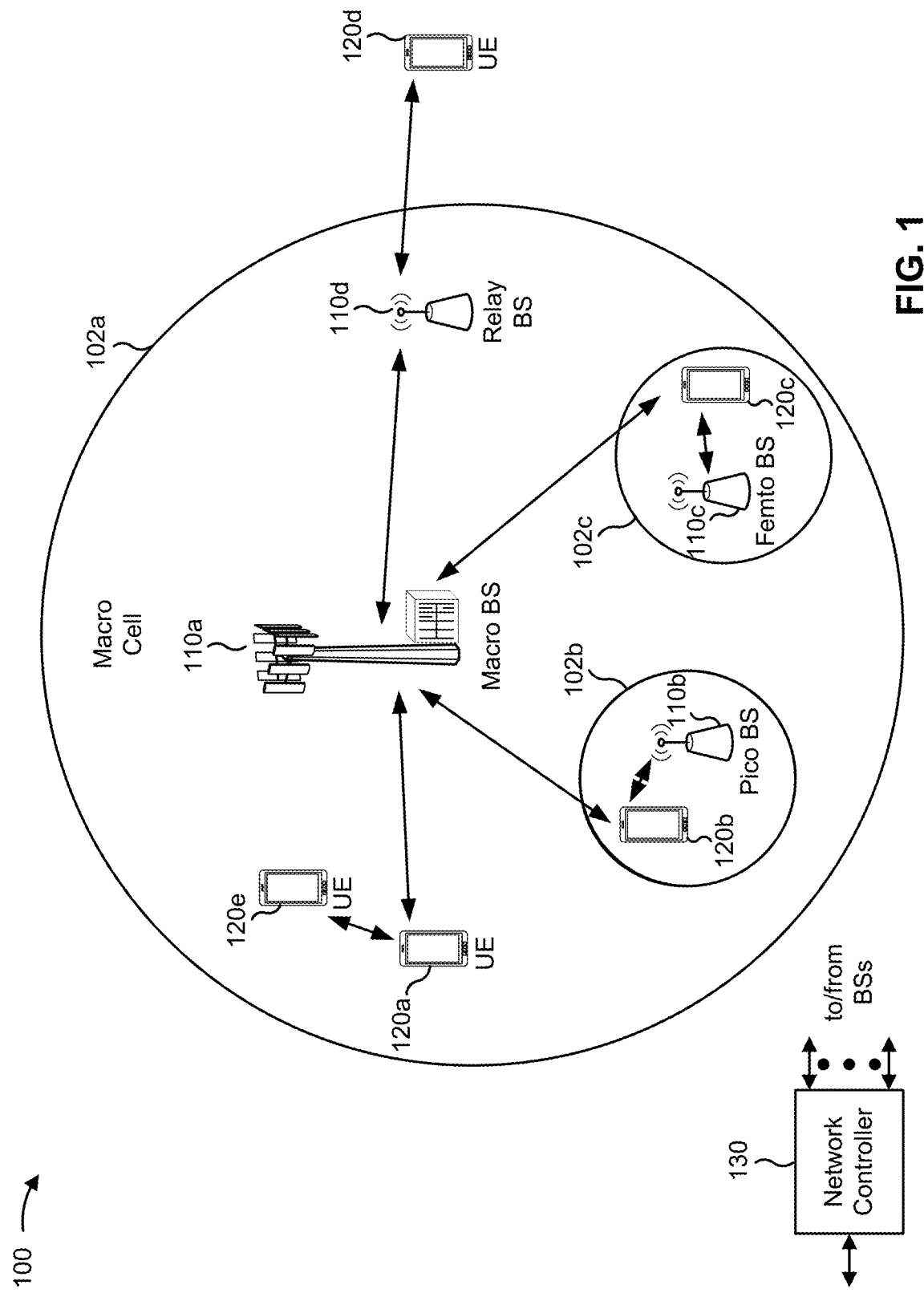
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. ABS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
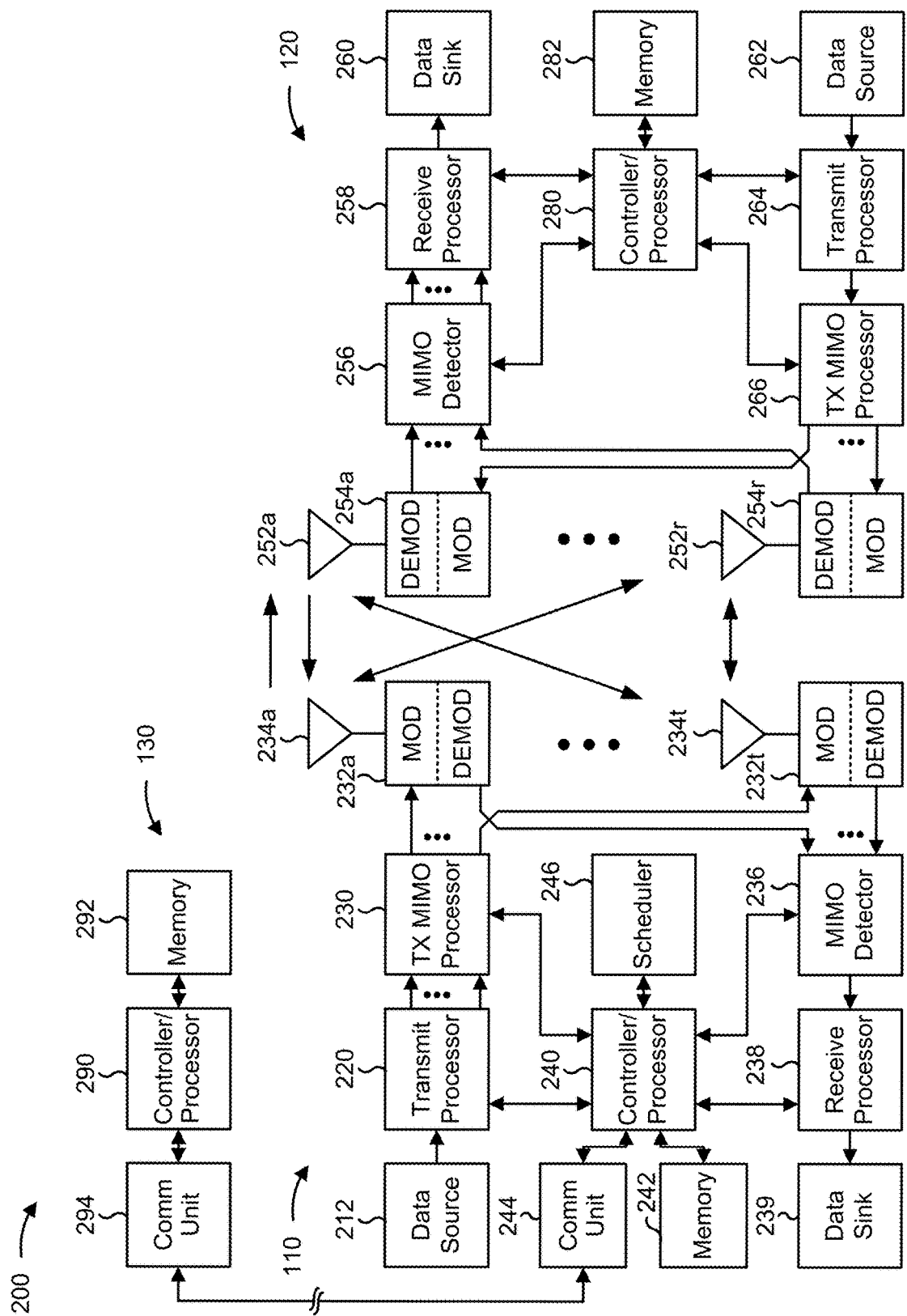
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with low latency relaying of a notification signal in an IAB network, as described in more detail elsewhere herein. Additionally, or alternatively, a node in an IAB network (e.g., an IAB node, an IAB donor, and/or the like) and/or a node in another type of multi-hop network may perform one or more techniques associated with low latency relaying of a notification signal in an IAB network. As described in more detail elsewhere herein, such a node may include a mobile termination or a mobile terminal (MT) component and a distributed unit (DU) component. Additionally, or alternatively, a node (e.g., an IAB donor) may include a central unit (CU) component and a DU. The MT component may perform one or more functions of a UE 120 described herein (e.g., in connection with FIGS. 1-3) and/or may include one or more components of a UE 120 described herein (e.g., in connection with FIG. 2). The DU component may perform one or more functions of a base station 110 described herein (e.g., in connection with FIGS. 1-3), such as scheduling, and/or may include one or more components of a base station 110 described herein (e.g., in connection with FIG. 2). The CU component may perform one or more functions of a base station 110 described herein (e.g., in connection with FIGS. 1-3), such as configuration for other nodes, and/or may include one or more components of a base station 110 described herein (e.g., in connection with FIG. 2).

Figure 8:
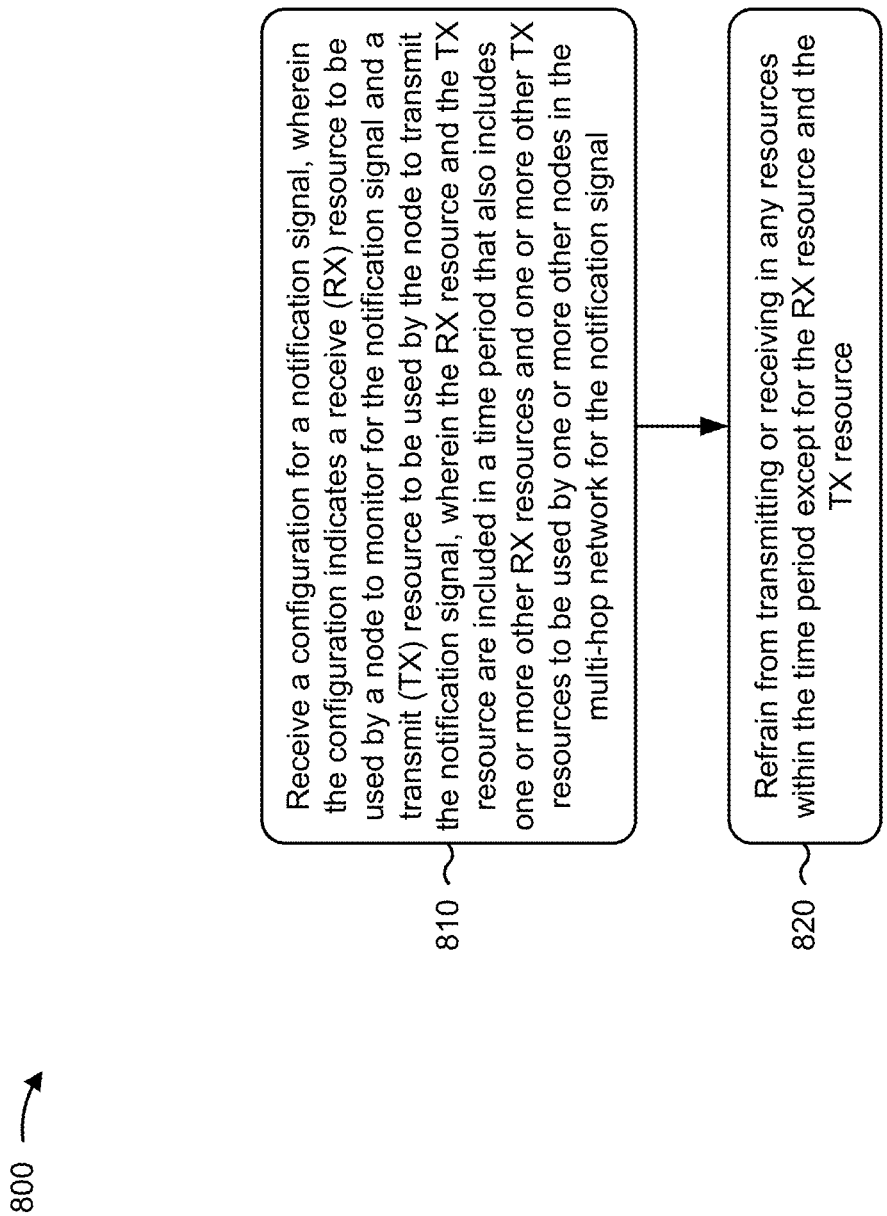

In some aspects, controller/processor 240 of base station 110 and/or a node, controller/processor 280 of UE 120 and/or a node, and/or any other component(s) of FIG. 2 may perform or direct operations of, for example, process 800 of FIG. 8, process 900 of FIG. 9, and/or other processes as described herein. Memories 242 and 282 may store data and program codes for base station 110 and UE 120, respectively. A scheduler 246 may schedule UEs for data transmission on the downlink and/or uplink.

In some aspects, a node in a multi-hop network (e.g., as described elsewhere herein) may include means for receiving a configuration for a notification signal, wherein the configuration indicates a receive (RX) resource to be used by the node to monitor for the notification signal and a transmit (TX) resource to be used by the node to transmit the notification signal, wherein the RX resource and the TX resource are included in a time period that also includes one or more other RX resources and one or more other TX resources to be used by one or more other nodes in the multi-hop network for the notification signal; means for refraining from transmitting or receiving in any resources within the time period except for the RX resource and the TX resource; and/or the like. In some aspects, such means may include one or more components of UE 120 and/or base station 110 (which may be included in the node) described in connection with FIG. 2.

In some aspects, a triggering node in a multi-hop network (e.g., as described elsewhere herein) may include means for transmitting a configuration for a notification signal, wherein the configuration indicates a set of RX resources to be used by a corresponding set of nodes to monitor for the notification signal and a set of TX resources to be used by the corresponding set of nodes to transmit the notification signal, wherein the set of RX resources and the set of TX resources are included in a time period during which each node, in the set of nodes, is configured to refrain from transmitting or receiving on any resources other than a respective RX resource and a respective TX resource configured for that node; means for transmitting the notification signal to one or more nodes in the multi-hop network; and/or the like. In some aspects, such means may include one or more components of UE 120 and/or base station 110 (which may be included in the triggering node) described in connection with FIG. 2.

As indicated above, FIG. 2 is provided as an example. Other examples may differ from what is described with regard to FIG. 2.

Figure 3:
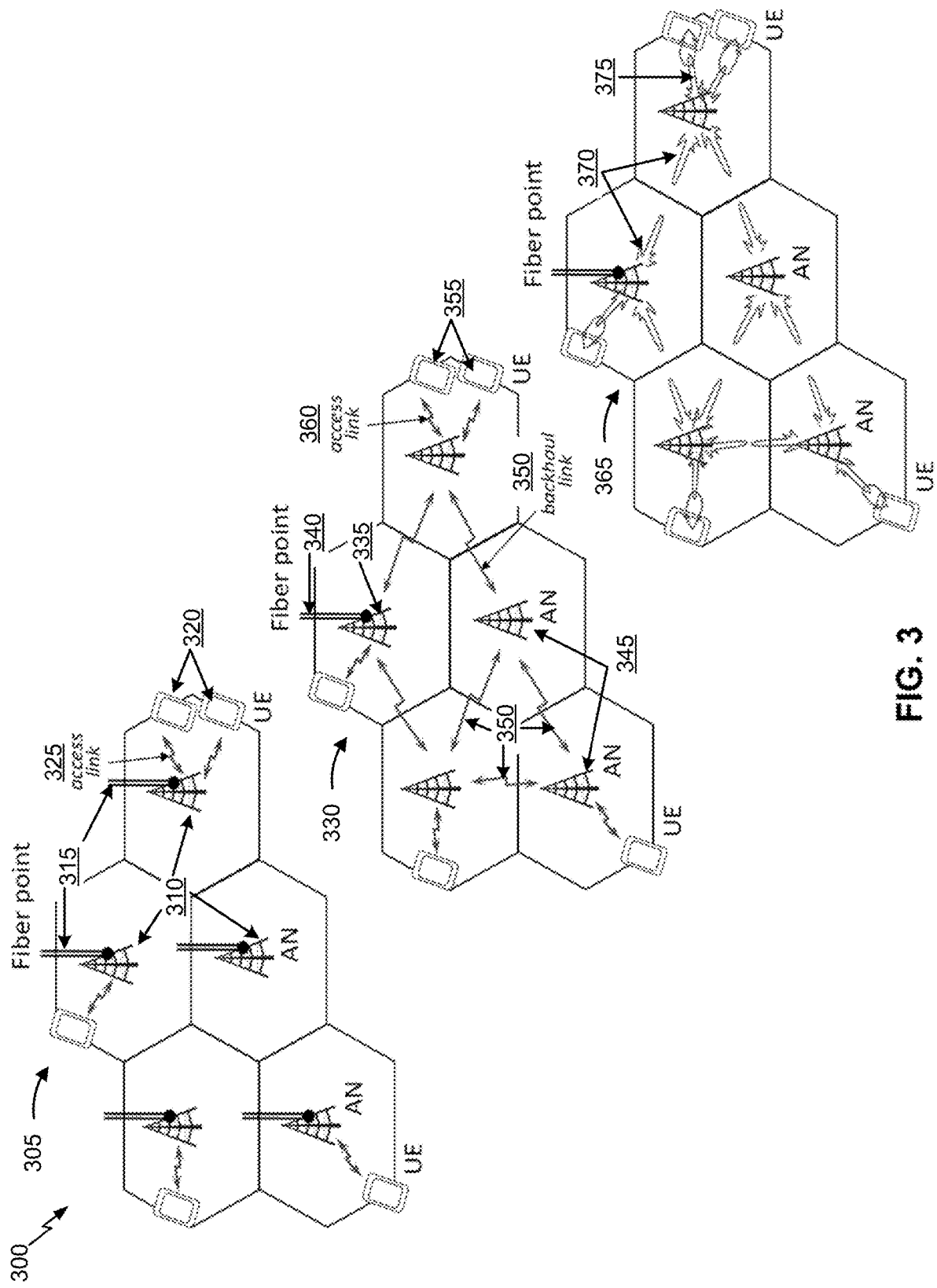
FIG. 3 is a diagram illustrating examples of radio access networks, in accordance with various aspects of the present disclosure.

FIG. 3 is a diagram illustrating examples 300 of radio access networks, in accordance with various aspects of the disclosure.

As shown by reference number 305, a traditional (e.g., 3G, 4G, LTE, and/or the like) radio access network may include multiple base stations 310 (e.g., access nodes (AN)), where each base station 310 communicates with a core network via a wired backhaul link 315, such as a fiber connection. A base station 310 may communicate with a UE 320 via an access link 325, which may be a wireless link. In some aspects, a base station 310 shown in FIG. 3 may be a base station 110 shown in FIG. 1. In some aspects, a UE 320 shown in FIG. 3 may be a UE 120 shown in FIG. 1.

As shown by reference number 330, a radio access network may include a wireless backhaul network, sometimes referred to as an integrated access and backhaul (IAB) network. In an IAB network, at least one base station is an anchor base station 335 that communicates with a core network via a wired backhaul link 340, such as a fiber connection. An anchor base station 335 may also be referred to as an IAB donor (or IAB-donor). The IAB network may include one or more non-anchor base stations 345, sometimes referred to as relay base stations or IAB nodes (e.g., IAB-nodes). The non-anchor base station 345 may communicate directly or indirectly with the anchor base station 335 via one or more backhaul links 350 (e.g., via one or more non-anchor base stations 345) to form a backhaul path to the core network for carrying backhaul traffic. Backhaul link 350 may be a wireless link. Anchor base station(s) 335 and/or non-anchor base station(s) 345 may communicate with one or more UEs 355 via access links 360, which may be wireless links for carrying access traffic. In some aspects, an anchor base station 335 and/or a non-anchor base station 345 shown in FIG. 3 may be a base station 110 shown in FIG. 1. In some aspects, a UE 355 shown in FIG. 3 may be a UE 120 shown in FIG. 1.

As shown by reference number 365, in some aspects, a radio access network that includes an IAB network may utilize millimeter wave technology and/or directional communications (e.g., beamforming and/or the like) for communications between base stations and/or UEs (e.g., between two base stations, between two UEs, and/or between a base station and a UE). For example, wireless backhaul links 370 between base stations may use millimeter wave signals to carry information and/or may be directed toward a target base station using beamforming and/or the like. Similarly, the wireless access links 375 between a UE and a base station may use millimeter wave signals and/or may be directed toward a target wireless node (e.g., a UE and/or a base station). In this way, inter-link interference may be reduced.

The configuration of base stations and UEs in FIG. 3 is shown as an example, and other examples are contemplated. For example, one or more base stations illustrated in FIG. 3 may be replaced by one or more UEs that communicate via a UE-to-UE access network (e.g., a peer-to-peer network, a device-to-device network, and/or the like). In this case, an anchor node may refer to a UE that is directly in communication with a base station (e.g., an anchor base station or a non-anchor base station).

As indicated above, FIG. 3 is provided as an example. Other examples may differ from what is described with regard to FIG. 3.

Figure 4:
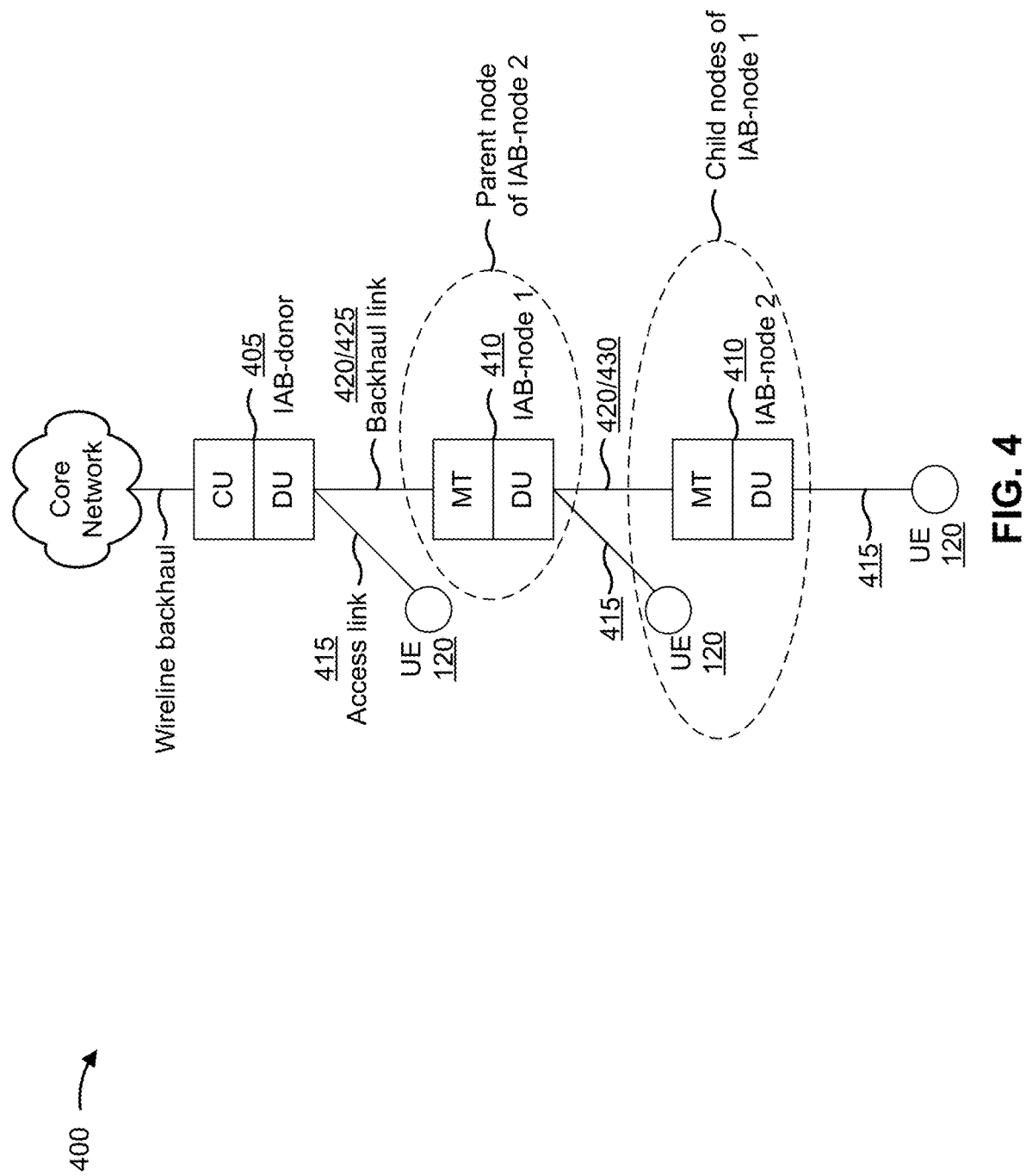
FIG. 4 is a diagram illustrating an example of an integrated access and backhaul (IAB) network architecture, in accordance with various aspects of the present disclosure.

FIG. 4 is a diagram illustrating an example 400 of an IAB network architecture, in accordance with various aspects of the disclosure.

As shown in FIG. 4, an IAB network may include an IAB donor 405 (shown as IAB-donor 405) that connects to a core network via a wired connection (shown as a wireline backhaul). For example, an Ng interface of an IAB donor 405 may terminate at a core network. Additionally, or alternatively, an IAB donor 405 may connect to one or more devices of the core network that provide a core access and mobility management function (e.g., AMF). In some aspects, an IAB donor 405 may include a base station 110, such as an anchor base station, as described above in connection with FIG. 3. As shown, an IAB donor 405 may be include a central unit (CU), which may perform access node controller (ANC) functions, AMF functions, and/or the like. The CU may configure a distributed unit (DU) of the IAB donor 405 and/or may configure one or more IAB nodes 410 (e.g., an MT and/or a DU of an IAB node 410) that connect to the core network via the IAB donor 405. Thus, a CU of an IAB donor 405 may control and/or configure the entire IAB network that connects to the core network via the IAB donor 405, such as by using control messages and/or configuration messages (e.g., a radio resource control (RRC) configuration message and/or the like).

As further shown in FIG. 4, the IAB network may include IAB nodes 410 (shown as IAB-node 1 and IAB-node 2) that connect to the core network via the IAB donor 405. As shown, an IAB node 410 may include mobile termination (MT) functions (also sometimes referred to as UE functions (UEF)) and may include DU functions (also sometimes referred to as access node functions (ANF)). The MT functions of an IAB node 410 (e.g., a child node) may be controlled and/or scheduled by another IAB node 410 (e.g., a parent node of the child node) and/or by an IAB donor 405. The DU functions of an IAB node 410 (e.g., a parent node) may control and/or schedule other IAB nodes 410 (e.g., child nodes of the parent node) and/or UEs 120. Thus, a DU may be referred to as a scheduling node or a scheduling component, and an MT may be referred to as a scheduled node or a scheduled component. In some aspects, an IAB donor 405 may include DU functions and not MT functions. That is, an IAB donor 405 may configure, control, and/or schedule communications of IAB nodes 410 and/or UEs 120. A UE 120 may include only MT functions, and not DU functions. That is, communications of a UE 120 may be controlled and/or scheduled by an IAB donor 405 and/or an IAB node 410 (e.g., a parent node of the UE 120).

When a first node controls and/or schedules communications for a second node (e.g., when the first node provides DU functions for the second node's MT functions), the first node may be referred to as a parent node of the second node, and the second node may be referred to as a child node of the first node. A child node of the second node may be referred to as a grandchild node of the first node. Thus, a DU function of a parent node may control and/or schedule communications for child nodes of the parent node. A parent node may be an IAB donor 405 or an IAB node 410, and a child node may be an IAB node 410 or a UE 120. Communications of an MT function of a child node may be controlled and/or scheduled by a parent node of the child node.

As further shown in FIG. 4, a link between a UE 120 (e.g., which only has MT functions, and not DU functions) and an IAB donor 405, or between a UE 120 and an IAB node 410, may be referred to as an access link 415. Access link 415 may be a wireless access link that provides a UE 120 with radio access to a core network via an IAB donor 405, and optionally via one or more IAB nodes 410. Thus, the network illustrated in FIG. 4 may be referred to as a multi-hop network.

As further shown in FIG. 4, a link between an IAB donor 405 and an IAB node 410 or between two IAB nodes 410 may be referred to as a backhaul link 420. Backhaul link 420 may be a wireless backhaul link that provides an IAB node 410 with radio access to a core network via an IAB donor 405, and optionally via one or more other IAB nodes 410. In some aspects, a backhaul link 420 may be a primary backhaul link or a secondary backhaul link (e.g., a backup backhaul link). In some aspects, a secondary backhaul link may be used if a primary backhaul link fails, becomes congested, becomes overloaded, and/or the like. As used herein, a node or a wireless node may refer to an IAB donor 405 or an IAB node 410.

In an IAB network, network resources for wireless communications (e.g., time resources, frequency resources, spatial resources, and/or the like) may be shared between a parent link 425 of an IAB node 410 (shown as link 420/425 for IAB-node 1) and a child link 430 of the IAB node 410 (shown as link 420/430 for IAB-node 1). When an IAB node 410 uses time division multiplexing (TDM) between a parent link 425 and a child link 430, the IAB node 410 is subject to a half duplex constraint, meaning that the IAB node 410 cannot transmit and receive information at the same time (e.g., cannot concurrently communicate via a parent link 425 of the IAB node 410 and a child link 430 of the IAB node 410). This constraint may lead to high latency for communications.

In some cases, all child links 430 of an IAB node 410 may be scheduled by a DU of the IAB node 410, and techniques such as a time-division duplexing (TDD) slot configuration may be used to address the half duplex constraint, where each time resource is indicated as a downlink (DL) resource, an uplink (UL) resource, or a flexible resource. In some cases, both child backhaul links 420 and child access links 415 of an IAB node 410 can be scheduled by the IAB node 410 in the same time resource but with different resource blocks (e.g., different frequency domain resources) as long as both links follow the same direction, either DL or UL as defined by a TDD slot configuration for the IAB node 410.

However, a parent backhaul link 425 of an IAB node 410 and a child link 430 of the IAB node 410 are scheduled by different DUs. The parent backhaul link is scheduled by a DU of a parent node of the IAB node 410, while the child links are scheduled by the DU of the IAB node 410. To avoid scheduling conflicts that violate the half duplex constraint of the IAB node 410, a TDM solution can be adopted in the IAB network so that different (e.g., non-overlapping) sets of time resources are coordinated between a parent DU and a child DU for control by the respective DUs. In this case, the parent backhaul link 425 of an IAB node 410 (controlled by the parent DU) is active in a first set of time resources, while the child links 430 of the IAB node 410 (controlled by the DU of the IAB node 410), including both child access links 415 and child backhaul links 420, are active in a second set of time resources.

Other schemes such as spatial division multiplexing (SDM) and/or frequency division multiplexing (FDM) simultaneous TX or SDM and/or FDM simultaneous RX between a parent backhaul link 425 and child links 430 can also be adopted in an IAB network to handle the half duplex constraint. For SDM and/or FDM simultaneous TX, both the parent backhaul link 425 and child links 430 can use the same time resource but with different directions (e.g., parent link with UL and child links with DL) so that the IAB node 410 is in a transmission mode over both links. Similarly, for SDM and/or FDM simultaneous RX, the IAB node 410 may be in a reception mode over both links.

In some cases, a CU of an IAB donor 405 may configure resource patterns for IAB nodes 410 in the IAB network. For example, a time resource may be configured as downlink-only, uplink-only, flexible, or not available (e.g., unavailable). When a time resource is configured as downlink-only for a wireless node, that time resource may be available for only downlink communications of the wireless node, and not uplink communications. Similarly, when a time resource is configured as uplink-only for a wireless node, that time resource may be available for only uplink communications of the wireless node, and not downlink communications. When a time resource is configured as flexible for a wireless node, that time resource may be available for both downlink communications and uplink communications of the wireless node. When a time resource is configured as not available for a wireless node, that time resource may not be used for any communications of the wireless node.

Time resources in an IAB network that are configured as downlink-only, uplink-only, or flexible may be further configured as hard resources or soft resources. When a time resource is configured as a hard resource for a wireless node, that time resource is always available for communications of the wireless node. For example, a hard downlink-only time resource is always available for only downlink communications of the wireless node, a hard uplink-only time resource is always available for only uplink communications of the wireless node, and a hard flexible time resource is always available for uplink and downlink communications of the wireless node.

When a time resource is configured as a soft resource for a wireless node, the availability of that time resource is controlled by a parent node of the wireless node (e.g., by a DU of the parent node). For example, the parent node may indicate (e.g., explicitly or implicitly) whether a soft time resource is available for communications of the wireless node. Thus, a soft time resource may be in one of two states: a schedulable state (e.g., when the soft time resource is available for scheduling and/or communications of the wireless node) and a non-schedulable state (e.g., when the soft time resource is not available for scheduling and is not available for communications of the wireless node). For example, a soft downlink-only time resource is only available for downlink communications of the wireless node when a parent node of the wireless node indicates that the soft downlink-only time resource is available. Similarly, a soft uplink-only time resource is only available for uplink communications of the wireless node when a parent node of the wireless node indicates that the soft uplink-only time resource is available. A soft flexible time resource is only available for uplink and downlink communications of the wireless node when a parent node of the wireless node indicates that the soft flexible time resource is available.

When resources of an IAB network are configured as indicated above, an IAB node 410 may be required to wait for transmission of a communication until an available downlink time resource (e.g., a hard downlink resource, an available soft downlink resource, and/or the like) is configured and/or scheduled for the IAB node 410 (e.g., according to a resource pattern configured for the IAB node 410). This may increase latency in the IAB network, especially when such waiting occurs at multiple hops (e.g., multiple IAB nodes 410). However, some scenarios may require lower latency, such as an ultra-reliable low latency communication (URLLC), indication of a failure of an IAB node 410 and/or an IAB donor 405, and/or the like. Semi-static reconfiguration of time resources by a CU to permit low latency when such a scenario occurs may be too slow to be effective. Dynamic coordination by a DU is faster than semi-static reconfiguration, but is subject to the limitations of a resource pattern configured for the DU and is also limited by the periodicity of a control channel (e.g., a physical downlink control channel (PDCCH)) used for such coordination. This could be overcome by configuring multiple control channel occasions within a slot, but that would increase overhead. Some techniques and apparatuses described herein permit low latency relaying of a notification signal in an IAB network and/or another type of multi-hop network without being subject to the limitations of semi-static reconfiguration or dynamic coordination described above. Additional details are described below.

As indicated above, FIG. 4 is provided as an example. Other examples may differ from what is described with regard to FIG. 4.

Figure 5:
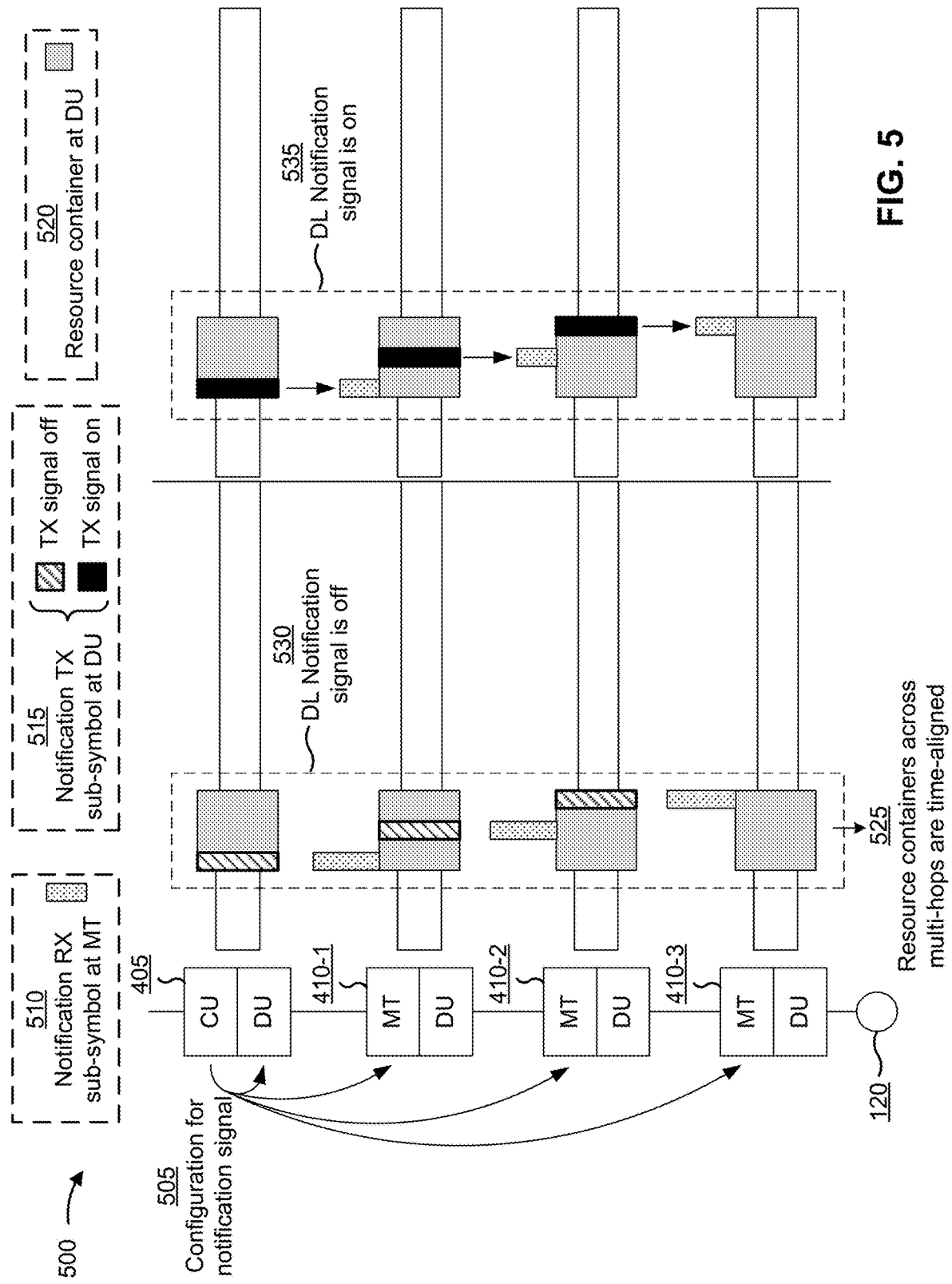
FIGS. 5-7 are diagrams illustrating examples of low latency relaying of a notification signal in an IAB network, in accordance with various aspects of the present disclosure.

FIG. 5 is a diagram illustrating an example 500 of low latency relaying of a notification signal in an IAB network, in accordance with various aspects of the present disclosure.

As shown by reference number 505, a CU of an IAB donor 405 may transmit a configuration for a notification signal, and one or more IAB nodes 410 may receive the configuration (such as a first IAB node 410-1, a second IAB node 410-2, and a third IAB node 410-3, as shown in FIG. 5). As shown, in some aspects, the IAB donor 405 may transmit the configuration to one or more child nodes of the IAB donor 405. A first child node may use the configuration to configure an MT and/or a DU of the first child node, and the first child node may relay the configuration to one or more second child nodes of the first child node. The configuration may be used to configure the IAB donor 405 (e.g., a DU of the IAB donor 405) and/or the IAB nodes 410 (e.g., an MT and/or a DU of the IAB node 410).

As shown by reference number 510, the configuration for a node may indicate a receive (RX) resource to be used by the node to monitor for the notification signal. The RX resource may be a time domain resource, such as a symbol or a sub-symbol. A sub-symbol may refer to a transmission time interval (TTI) with a duration that is less than a duration of a symbol used in the IAB network to transmit, receive, and/or schedule communications other than the notification signal (e.g., communications outside of a time period reserved for the notification symbol). For example, the notification signal may be transmitted in a symbol that has a shorter symbol duration than a symbol duration used for communications outside of a time period (e.g., a resource container) reserved for the notification signal. In this case, a higher sub-carrier spacing may be used for the notification signal within the time period as compared to a sub-carrier spacing used for communications outside of the time period. The time period reserved for the notification signal may span multiple sub-symbols and/or one or more symbols having a symbol duration used for communications outside of the time period. An RX resource for a node may be reserved for use by an MT of the node (e.g., an IAB node 410) to monitor for a notification signal.

As shown by reference number 515, the configuration for a node may indicate a transmit (TX) resource to be used by the node to transmit the notification signal (e.g., to relay a notification signal, received from a parent node, to one or more child nodes). The TX resource may be a time domain resource, such as a symbol or a sub-symbol, as defined above. A TX resource for a node may be reserved for use by a DU of the node (e.g., an IAB node 410 or an IAB donor 405) to transmit a notification signal.

As shown by reference number 520, the RX resource and the TX resource may be included in a time period, sometimes referred to as a resource container. In addition to including the RX resource and the TX resource for a node, the time period may include one or more other RX resources and one or more other TX resources for one or more other nodes. A node that is configured with an RX resource and a TX resource in a time period reserved for the notification signal may refrain from transmitting in any resources in the time period except for the TX resource configured for the node, and/or may refrain from receiving (or monitoring) in any resources in the time period except for the RX resource configured for the node. In this case, the configuration may indicate the time period (e.g., a length of the time period, a start of the time period, an end of the time period, one or more resources reserved for the time period and/or the notification signal, and/or the like).

As shown by reference number 525, the resource containers across different nodes in the IAB network are time-aligned such that the resource containers occupy the same time resources for the different nodes. Additionally, or alternatively, the TX resources and the RX resources may be time-aligned across different nodes such that a TX resource of a parent node occupies the same time resource as an RX resource of a child node of the parent node. Furthermore, an RX resource for a node may occur earlier in time than a TX resource of the node so that the node can transmit a notification signal, received in the RX resource, in the TX resource.

For example, the IAB donor 405 shown in FIG. 5 is configured with a TX resource in a first sub-symbol of a resource container, and the first IAB node 410-1 is configured with an RX resource in the first sub-symbol. Similarly, the first IAB node 410-1 is configured with a TX resource in a second sub-symbol of a resource container, and the second IAB node 410-2 is configured with an RX resource in the second sub-symbol. In some aspects, the second sub-symbol may occur immediately after the first sub-symbol to reduce latency. Alternatively, there may be a small gap between the first sub-symbol and the second sub-symbol to permit a node to process a received notification signal prior to transmission of the notification signal. As further shown, the second IAB node 410-2 is configured with a TX resource in a third sub-symbol of a resource container, and the third IAB node 410-3 is configured with an RX resource in the third sub-symbol. Thus, in some aspects, a location of an RX resource and a location of the TX resource (e.g., a time domain location within the resource container) for a node may depend on a number of hops from the node to the IAB donor 405 that configures the node. For example, a node that is fewer hops from the IAB donor 405 may be configured with an RX resource (or a TX resource) that occurs earlier in time than an RX resource (or a TX resource) of a node that is more hops from the IAB donor 405.

The number of hops in the IAB network shown in FIG. 5 is provided as an example, and other examples are contemplated. In some aspects, a size of the resource container (e.g., a duration of a time period reserved for the notification signal) may depend on the number of hops (e.g., a hop count) in the IAB network (or a branch of the IAB network), and the IAB donor 405 may configure the size of the resource container based at least in part on the number of hops. In some aspects, the IAB donor 405 may configure different branches of the IAB network with resource containers of different sizes depending on a number of hops in the branch.

As shown by reference number 530, when the IAB donor 405 does not detect a triggering event that triggers transmission of the notification signal, then the IAB donor 405 may refrain from transmitting the notification signal in a TX resource reserved for the IAB donor 405. In this case, the first IAB node 410-1 will not receive a notification signal in the RX resource reserved for the first IAB node 410-1, and will therefore not transmit a notification signal in the TX resource reserved for the first IAB node 410-1, and so on.

As shown by reference number 535, when the IAB donor 405 detects a triggering event that triggers transmission of the notification signal, then the IAB donor 405 may transmit the notification signal in a TX resource reserved for the IAB donor 405. In this case, the first IAB node 410-1 will receive the notification signal in the RX resource reserved for the first IAB node 410-1, and will transmit the notification signal in the TX resource reserved for the first IAB node 410-1, and so on. In some aspects, the triggering event may include reception of a URLLC communication or a similar type of communication with a low latency requirement. Additionally, or alternatively, the triggering event may include a determination by a node that a backhaul link with a parent node of the node has failed.

Although aspects are described above in connection with the IAB donor 405 monitoring for and/or detecting a triggering event, an IAB node 410 may monitor for and/or detect a triggering event in some aspects. In some aspects, a node that transmits a configuration for a notification signal and/or that detects a triggering event for the notification signal may be referred to as a triggering node.

In some aspects, the notification signal may include a single bit to conserve overhead. For example, the notification signal may carry a single bit of information that indicates whether an action, associated with the notification signal, is to be performed by a node. In this case, when a node receives the notification signal in an RX resource reserved for the node, the node may perform the action associated with the notification signal. In some aspects, the action may be performed in connection with one or more resources outside of the time period reserved for the notification signal. When the notification signal includes only a single bit, then the action may be prespecified (e.g., according to a wireless communication standard), may be configured by the IAB donor 405 (e.g., in the configuration for the notification signal), or may be indicated in one or more messages other than the notification signal, such as downlink control information (DCI), a media access control (MAC) control element (CE) (MAC-CE), a message received after the notification signal, and/or the like. In some aspects, the action may include monitoring for a message (e.g., in a prespecified or configured resource) that instructs the node to perform an additional action. Additional details regarding actions are described below in connection with FIG. 6.

In some aspects, the notification signal may include more than one bit of information. For example, the notification signal may indicate a route via which the notification signal is to be transmitted by the node. In this case, the node may decode the notification signal and may transmit the notification signal to one or more child nodes included in the route. Additionally, or alternatively, the notification signal may indicate an action to be performed by the node in connection with receiving the notification signal and/or a time at which the action is to be performed by the node, as described in more detail elsewhere herein.

In some aspects, a node may receive a notification signal in an RX resource reserved for the node, may identify one or more next-hop nodes (e.g., one or more child nodes) to which the notification signal is to be transmitted, and may transmit the notification signal to the one or more next-hop nodes in a TX resource reserved for the node. In some aspects, the node may identify a next-hop node based at least in part on routing information (e.g., a route) indicated in the notification signal. In some aspects, the node may identify a next-hop node based at least in part on routing information indicated in a message other than the notification signal. For example, the routing information may be indicated in a configuration for the notification signal that is transmitted by an IAB donor 405 (e.g., an RRC configuration), may be indicated in a bearer configuration transmitted by the IAB donor 405 (e.g., a bearer configuration for URLLC, sometimes referred to as a URLLC bearer configuration), may be indicated in DCI or a MAC-CE, and/or the like. In some aspects, a node may transmit a notification signal to all child nodes of the node (e.g., as a default configuration when one or more next-hop nodes for the notification signal are not indicated to the node).

In some aspects, a node may transmit a received notification signal without modifying the notification signal. For example, the node may receive a notification signal in an RX resource, may decode and/or read information in the notification signal (e.g., to identify a next hop and/or the like), and may transmit the notification signal in a TX resource without modifying the notification signal. In some aspects, the node may transmit the notification signal prior to decoding (e.g., partially decoding or fully decoding) the notification signal. In this way, latency may be further reduced (e.g., when the notification signal is transmitted to all child nodes or when a route for transmission of the notification signal is determined prior to reception of the notification signal).

In some aspects, a node may transmit a received notification signal after modifying information carried in the notification signal. For example, an action and/or an action time (e.g., a time at which an action is to be performed) may depend on a hop count of node. In this case, the node may modify a received notification signal to reflect this dependency for a next-hop, and may transmit the modified notification signal to the next-hop.

By using a notification signal as described herein, an IAB network may be capable of low latency relaying of the notification signal, which permits nodes and/or resources of the IAB network to be dynamically reconfigured more quickly than a semi-static reconfiguration (e.g., via an RRC message) and uses less resource overhead as compared to configuring multiple PDCCHs for dynamic reconfiguration. This may reduce latency or delay for other actions to be performed in connection with the notification signal, such as relaying of communications (e.g., URLLC communications), re-routing communications (e.g., in the event of a failure in the IAB network or a portion of the IAB network), and/or the like.

As indicated above, FIG. 5 is provided as an example. Other examples may differ from what is described with regard to FIG. 5.

Figure 6:
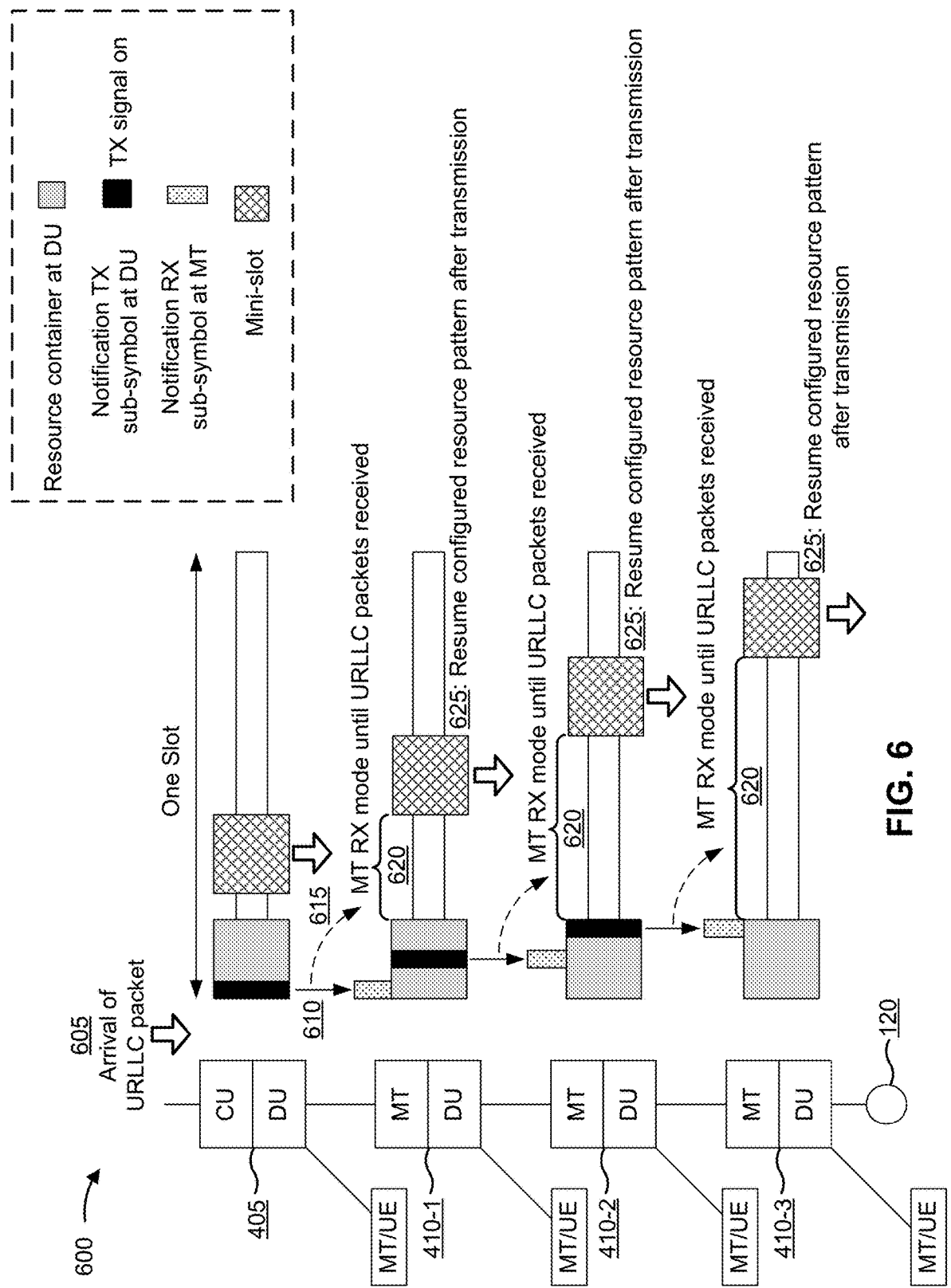

FIG. 6 is a diagram illustrating another example 600 of low latency relaying of a notification signal in an IAB network, in accordance with various aspects of the present disclosure. FIG. 6 shows an example scenario where notification signals may be used to reduce latency of URLLC communications. For the purposes of FIG. 6, IAB nodes 410 in the IAB network have been configured by an IAB donor 405 as described above in connection with FIG. 5.

As shown by reference number 605, the IAB donor 405 may receive a URLLC packet (e.g., URLLC data), which may be a triggering event that triggers transmission of the notification signal. This triggering event is provided as an example, and other examples may differ from this example. For example, the triggering event may include a determination that a backhaul link has failed.

As shown by reference number 610, based at least in part on detecting the triggering event, the IAB donor 405 may transmit a notification signal in a TX resource reserved for the IAB donor 405 in a first sub-symbol of a resource container (e.g., a time period) reserved for the notification signal, and the first IAB node 410-1 may receive the notification signal in an RX resource in the first sub-symbol.

As shown by reference number 615, the first IAB node 410-1 may perform an action based at least in part on receiving the notification signal. As shown, the action may be performed outside of the resource container. In example 600, the action includes monitoring for one or more URLLC communications (e.g., by the MT). As described above in connection with FIG. 5, the action may be prespecified (e.g., according to a wireless communication standard), may be configured by the IAB donor 405 (e.g., a CU of the IAB donor 405), may be indicated by the notification signal, may be indicated in one or more messages other than the notification signal (e.g., from the IAB donor 405 and/or a parent node), and/or the like.

In some aspects, performing the action may include overriding one or more resource configurations for the node. For example, the node may be configured with one or more resource configurations according to a resource pattern configured for a node, as described above in connection with FIG. 4. The node may perform the action by overriding a resource configuration. In example 600, the first IAB node 410-1 may override one or more downlink resources configured for the DU to monitor for a URLLC communication using the MT.

A node may perform an action according to an action time, which may indicate a time to start the action, a time to end the action, a duration of the action, and/or the like. As described above in connection with FIG. 5, the action time may be prespecified (e.g., according to a wireless communication standard), may be configured by the IAB donor 405 (e.g., a CU of the IAB donor 405), may be indicated by the notification signal, may be indicated in one or more messages other than the notification signal (e.g., from the IAB donor 405 and/or a parent node), and/or the like.

As shown by reference numbers 620, in some aspects, the action time may depend on a hop count of a node. In example 600, the action time may represent a duration for monitoring for a URLLC communication, and nodes with a higher hop count are configured to monitor for a longer duration (e.g., due to a delay in reception of the communication at a node that is farther from the IAB donor 405). Although FIG. 6 shows each IAB node 410 starting to monitor for URLLC communications immediately after the end of the resource container, different IAB nodes 410 may start an action at different times depending on a hop count. For example, IAB nodes 410 located farther from the IAB donor 405 may start the action later, and may operate according to a resource pattern prior to starting the action, thereby improving resource utilization and reducing latency for other communications. As shown by reference numbers 625, a node may resume use of a configured resource pattern after performing the action.

In example 600, the action includes monitoring for a URLLC communication (e.g., URLLC data). This action may include, for example, monitoring a physical downlink shared channel (PDSCH). Other actions may include monitoring for a control message (e.g., on a physical downlink control channel (PDCCH), monitoring for a message that instructs the node to perform an additional action (e.g., a first message may schedule a second message), identifying a different route to an IAB donor 405 than a route currently being used by the node (e.g., in the case of a failure of a backhaul link in the IAB network) and/or communicating via the different route, and/or the like.

By using a notification signal as described herein, an IAB network may be capable of low latency relaying of the notification signal, which permits nodes and/or resources of the IAB network to be dynamically reconfigured more quickly than a semi-static reconfiguration (e.g., via an RRC message) and uses less resource overhead as compared to configuring multiple PDCCHs for dynamic reconfiguration. This may reduce latency or delay for other actions to be performed in connection with the notification signal, such as relaying of communications (e.g., URLLC communications), re-routing communications (e.g., in the event of a failure in the IAB network), and/or the like.

As indicated above, FIG. 6 is provided as an example. Other examples may differ from what is described with regard to FIG. 6.

Figure 7:
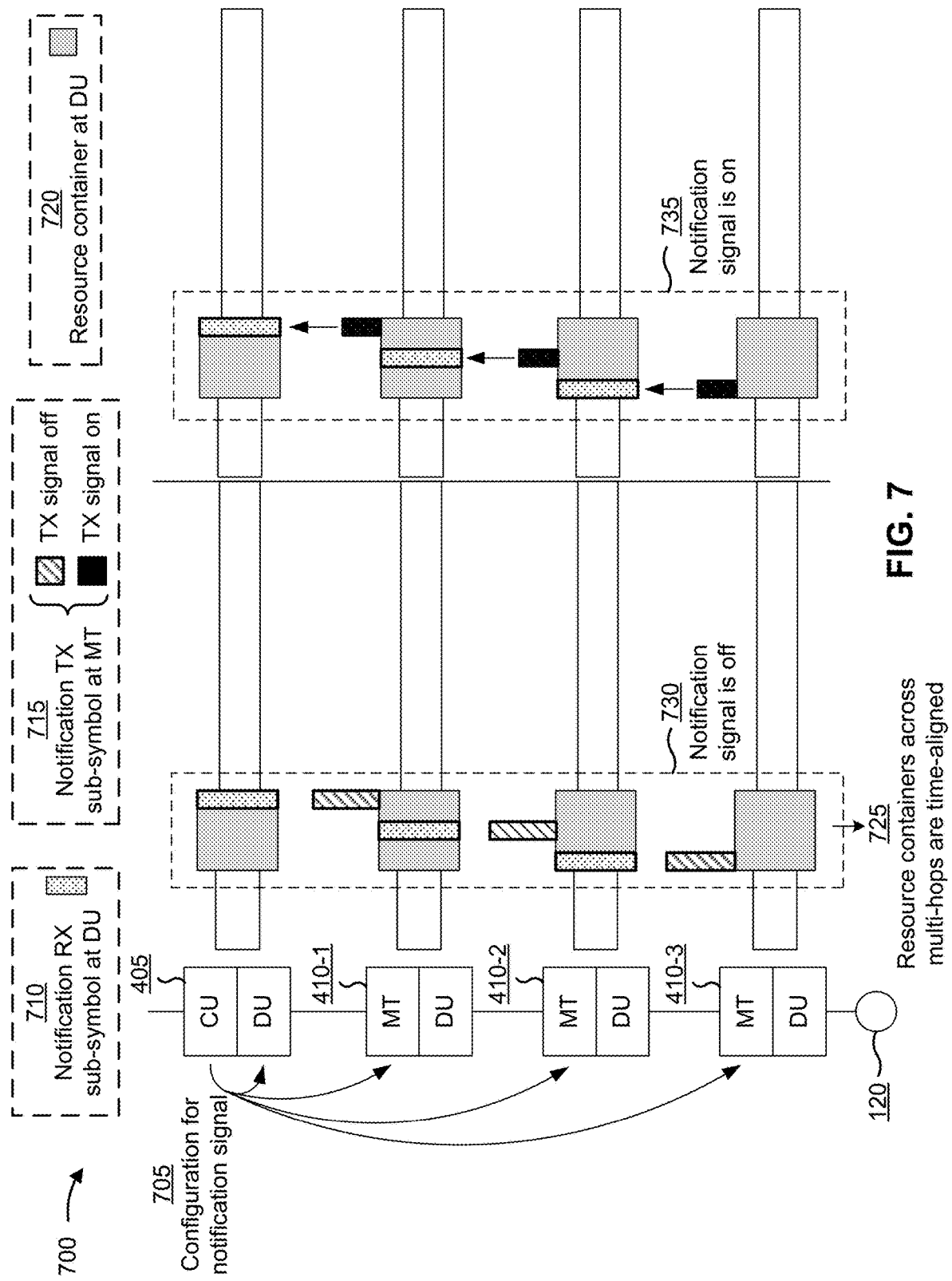

FIG. 7 is a diagram illustrating another example 700 of low latency relaying of a notification signal in an IAB network, in accordance with various aspects of the present disclosure. FIG. 7 describes an example of an uplink notification signal, similar to the downlink notification signal described above in connection with FIGS. 5 and 6.

As shown by reference number 705, a CU of an IAB donor 405 may transmit a configuration for a notification signal, and one or more IAB nodes 410 may receive the configuration (such as a first IAB node 410-1, a second IAB node 410-2, and a third IAB node 410-3, as shown in FIG. 7), in a similar manner as described above in connection with FIG. 5. The configuration described above in connection with FIG. 5 is for a downlink notification signal with RX resources configured for MTs and TX resources configured for DUs. The configuration described in connection with FIG. 7 is for an uplink notification signal with RX resources configured for DUs and TX resources configured for MTs.

As shown by reference number 710, the configuration for a node may indicate an RX resource to be used by the node to monitor for the notification signal, in a similar manner as described above in connection with FIG. 5. In example 700, the RX resource is configured for a DU, whereas the RX resource is configured for an MT in example 500 of FIG. 5.

As shown by reference number 715, the configuration for a node may indicate a TX resource to be used by the node to transmit the notification signal (e.g., to relay a notification signal, received from a child node, to one or more parent nodes), in a similar manner as described above in connection with FIG. 5. In example 700, the TX resource is configured for an MT, whereas the RX resource is configured for a DU in example 500 of FIG. 5.

As shown by reference number 720, the RX resource and the TX resource may be included in a time period (e.g., a resource container), as described above in connection with FIG. 5. As shown by reference number 725, the resource containers, the TX resources, and the RX resources may be time-aligned across different nodes in the IAB network, as described above in connection with FIG. 5.

As shown by reference number 730, when an IAB node 410 does not detect a triggering event that triggers transmission of the notification signal, then the IAB node 410 may refrain from transmitting the notification signal in a TX resource reserved for the IAB node 410. In this case, a parent node of the IAB node 410 will not receive a notification signal in the RX resource reserved for the parent node, and will therefore not transmit a notification signal in the TX resource reserved for the parent node, and so on.

As shown by reference number 735, when an IAB node 410 detects a triggering event that triggers transmission of the notification signal, then the IAB node 410 may transmit the notification signal in a TX resource reserved for the IAB node 410. In this case, a parent node of the IAB node 410 will receive the notification signal in the RX resource reserved for the parent node, and will transmit the notification signal in the TX resource reserved for the parent node, and so on. In some aspects, the triggering event may include reception of a URLLC communication or a similar type of communication with a low latency requirement. Additionally, or alternatively, the triggering event may include a determination by a node that a backhaul link with a parent node of the node has failed.

Additional operations may be performed in connection with the uplink notification signal in a similar manner as described elsewhere herein in connection with the downlink notification signal of FIGS. 5 and 6.

As indicated above, FIG. 7 is provided as an example. Other examples may differ from what is described with regard to FIG. 7.

FIG. 8 is a diagram illustrating an example process 800 performed, for example, by a node, in accordance with various aspects of the present disclosure. Example process 800 is an example where a node (e.g., IAB donor 405, IAB node 410, and/or the like) performs operations associated with low latency relaying of a notification signal in an integrated access and backhaul network.

As shown in FIG. 8, in some aspects, process 800 may include receiving a configuration for a notification signal, wherein the configuration indicates a receive (RX) resource to be used by the node to monitor for the notification signal and a transmit (TX) resource to be used by the node to transmit the notification signal, wherein the RX resource and the TX resource are included in a time period that also includes one or more other RX resources and one or more other TX resources to be used by one or more other nodes in the multi-hop network for the notification signal (block 810). For example, the node (e.g., using receive processor 238, receive processor 258, controller/processor 240, controller/processor 280, memory 242, memory 282, and/or the like) may receive a configuration for a notification signal, as described above. In some aspects, the configuration indicates an RX resource to be used by the node to monitor for the notification signal and a TX resource to be used by the node to transmit the notification signal. In some aspects, the RX resource and the TX resource are included in a time period that also includes one or more other RX resources and one or more other TX resources to be used by one or more other nodes in the multi-hop network for the notification signal.

As further shown in FIG. 8, in some aspects, process 800 may include refraining from transmitting or receiving in any resources within the time period except for the RX resource and the TX resource (block 820). For example, the node (e.g., using receive processor 238, receive processor 258, transmit processor 220, transmit processor 264, controller/processor 240, controller/processor 280, memory 242, memory 282, and/or the like) may refrain from transmitting or receiving in any resources within the time period except for the RX resource and the TX resource, as described above.

Process 800 may include additional aspects, such as any single aspect or any combination of aspects described below and/or in connection with one or more other processes described elsewhere herein.

In a first aspect, process 800 includes receiving the notification signal in the RX resource and transmitting the notification signal in the TX resource, wherein the notification signal has a shorter symbol duration than a symbol duration used for communications outside of the time period.

In a second aspect, alone or in combination with the first aspect, a location of the RX resource and a location of the TX resource within the time period depend on a hop count from the node to a central unit of a donor node.

In a third aspect, alone or in combination with one or more of the first and second aspects, the notification signal carries a single bit of information.

In a fourth aspect, alone or in combination with one or more of the first through third aspects, the notification signal indicates at least one of: a route via which the notification signal is to be transmitted by the node, an action to be performed by the node in connection with receiving the notification signal, a time at which the action is to be performed by the node, or a combination thereof.

In a fifth aspect, alone or in combination with one or more of the first through fourth aspects, process 800 includes receiving the notification signal in the RX resource, identifying a next-hop node to which the notification signal is to be transmitted, and transmitting the notification signal to the next-hop node in the TX resource.

In a sixth aspect, alone or in combination with one or more of the first through fifth aspects, the next-hop node is identified based at least in part on routing information included in the notification signal.

In a seventh aspect, alone or in combination with one or more of the first through sixth aspects, the next-hop node is identified based at least in part on a bearer configuration received from a central unit of a donor node.

In an eighth aspect, alone or in combination with one or more of the first through seventh aspects, process 800 includes receiving the notification signal in the RX resource, modifying information carried in the notification, and transmitting the notification signal with the modified information in the TX resource.

In a ninth aspect, alone or in combination with one or more of the first through eighth aspects, process 800 includes receiving the notification signal in the RX resource and relaying the notification signal in the TX resource prior to fully decoding the notification signal.

In a tenth aspect, alone or in combination with one or more of the first through ninth aspects, process 800 includes receiving the notification signal in the RX resource and performing an action in connection with one or more resources outside of the time period based at least in part on receiving the notification signal.

In an eleventh aspect, alone or in combination with one or more of the first through tenth aspects, the action is pre-specified, configured by a central unit, indicated by the notification signal, or indicated by one or more messages received after the notification signal.

In a twelfth aspect, alone or in combination with one or more of the first through eleventh aspects, the action includes overriding one or more resource configurations, defined by a resource pattern configured for the node, to monitor for a communication subsequent to the notification signal.

In a thirteenth aspect, alone or in combination with one or more of the first through twelfth aspects, process 800 includes resuming use of the resource pattern after performing the action.

In a fourteenth aspect, alone or in combination with one or more of the first through thirteenth aspects, the action is performed according to a time that is prespecified, configured by a central unit, or indicated by the notification signal.

In a fifteenth aspect, alone or in combination with one or more of the first through fourteenth aspects, the time depends on a hop count from the node to a central unit of a donor node.

In a sixteenth aspect, alone or in combination with one or more of the first through fifteenth aspects, the notification signal is triggered by an ultra-reliable low latency communication to be transmitted via the multi-hop network.

In a seventeenth aspect, alone or in combination with one or more of the first through sixteenth aspects, a route for transmission of the notification signal is configured for the node in connection with establishment of an ultra-reliable low latency communication bearer.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

FIG. 9 is a diagram illustrating an example process 900 performed, for example, by a triggering node, in accordance with various aspects of the present disclosure. Example process 900 is an example where a triggering node (e.g., IAB donor 405, IAB node 410, and/or the like) performs operations associated with low latency relaying of a notification signal in an integrated access and backhaul network.

As shown in FIG. 9, in some aspects, process 900 may include transmitting a configuration for a notification signal, wherein the configuration indicates a set of RX resources to be used by a corresponding set of nodes to monitor for the notification signal and a set of TX resources to be used by the corresponding set of nodes to transmit the notification signal, wherein the set of RX resources and the set of TX resources are included in a time period during which each node, in the set of nodes, is configured to refrain from transmitting or receiving on any resources other than a respective RX resource and a respective TX resource configured for that node (block 910). For example, the triggering node (e.g., using transmit processor 220, transmit processor 264, controller/processor 240, controller/processor 280, memory 242, memory 282, and/or the like) may transmit a configuration for a notification signal, as described above. In some aspects, the configuration indicates a set of RX resources to be used by a corresponding set of nodes to monitor for the notification signal and a set of TX resources to be used by the corresponding set of nodes to transmit the notification signal. In some aspects, the set of RX resources and the set of TX resources are included in a time period during which each node, in the set of nodes, is configured to refrain from transmitting or receiving on any resources other than a respective RX resource and a respective TX resource configured for that node.

As further shown in FIG. 9, in some aspects, process 900 may include transmitting the notification signal to one or more nodes in the multi-hop network (block 920). For example, the triggering node (e.g., using transmit processor 220, transmit processor 264, controller/processor 240, controller/processor 280, memory 242, memory 282, and/or the like) may transmit the notification signal to one or more nodes in the multi-hop network, as described above.

Process 900 may include additional aspects, such as any single aspect or any combination of aspects described below and/or in connection with one or more other processes described elsewhere herein.

In a first aspect, the notification signal has a shorter symbol duration than a symbol duration used for communications outside of the time period.

In a second aspect, alone or in combination with the first aspect, the notification signal carries a single bit of information.

In a third aspect, alone or in combination with one or more of the first and second aspects, the notification signal indicates at least one of: a route via which the notification signal is to be transmitted, an action to be performed in connection with the notification signal, a time at which the action is to be performed, or a combination thereof.

In a fourth aspect, alone or in combination with one or more of the first through third aspects, process 900 includes transmitting, in a message other than the notification signal, at least one of: routing information that identifies a route via which the notification signal is to be transmitted, information that identifies an action to be performed in connection with the notification signal, information that identifies a time at which the action is to be performed, or a combination thereof.

In a fifth aspect, alone or in combination with one or more of the first through fourth aspects, the routing information is indicated in a bearer configuration transmitted by the triggering node.

In a sixth aspect, alone or in combination with one or more of the first through fifth aspects, the notification signal is transmitted based at least in part on reception of an ultra-reliable low latency communication by the triggering node.

In a seventh aspect, alone or in combination with one or more of the first through sixth aspects, the notification signal is transmitted based at least in part on a determination that a portion of the multi-hop network has failed.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a node in a multi-hop network, comprising:
   receiving a configuration for a notification signal, wherein the configuration indicates a receive (RX) resource to be used by the node to monitor for the notification signal and a transmit (TX) resource to be used by the node to transmit the notification signal, wherein the RX resource and the TX resource are included in a time period that also includes one or more other RX resources and one or more other TX resources to be used by one or more other nodes in the multi-hop network for the notification signal, and wherein the notification signal has a shorter symbol duration than a symbol duration used for a communication outside of the time period; and
   at least one of:
      receiving the notification signal in the RX resource, or
      transmitting the notification signal in the TX resource.

2. The method of claim 1, further comprising receiving the notification signal in the RX resource and transmitting the notification signal in the TX resource.

3. The method of claim 1, wherein a location of the RX resource and a location of the TX resource within the time period depend at least in part on a hop count from the node to a central unit of a donor node.

4. The method of claim 1, wherein the notification signal carries a single bit of information.

5. The method of claim 1, wherein the notification signal indicates at least one of:
   a route via which the notification signal is to be transmitted by the node,
   an action to be performed by the node in connection with receiving the notification signal,
   a time at which the action is to be performed by the node, or
   a combination thereof.

6. The method of claim 1, further comprising receiving the notification signal in the RX resource, identifying a next-hop node to which the notification signal is to be transmitted, and transmitting the notification signal to the next-hop node in the TX resource.

7. The method of claim 6, wherein the next-hop node is identified based at least in part on routing information included in the notification signal.

8. The method of claim 6, wherein the next-hop node is identified based at least in part on a bearer configuration received from a central unit of a donor node.

9. The method of claim 1, further comprising receiving the notification signal in the RX resource, modifying information carried in the notification, and transmitting the notification signal with the modified information in the TX resource.

10. The method of claim 1, further comprising receiving the notification signal in the RX resource and relaying the notification signal in the TX resource prior to fully decoding the notification signal.

11. The method of claim 1, further comprising receiving the notification signal in the RX resource and performing an action in connection with one or more resources outside of the time period based at least in part on receiving the notification signal.

12. The method of claim 11, wherein the action is prespecified, configured by a central unit, indicated by the notification signal, or indicated by one or more messages received after the notification signal.

13. The method of claim 11, wherein the action includes overriding one or more resource configurations, defined by a resource pattern configured for the node, to monitor for a communication subsequent to the notification signal.

14. The method of claim 13, further comprising resuming use of the resource pattern after performing the action.

15. The method of claim 11, wherein the action is performed according to a time that is prespecified, configured by a central unit, or indicated by the notification signal.

16. The method of claim 15, wherein the time depends at least in part on a hop count from the node to a central unit of a donor node.

17. The method of claim 1, wherein the notification signal is triggered by an ultra-reliable low latency communication to be transmitted via the multi-hop network.

18. The method of claim 1, wherein a route for transmission of the notification signal is configured for the node in connection with establishment of an ultra-reliable low latency communication bearer.

19. A method of wireless communication performed by a triggering node in a multi-hop network, comprising:
transmitting a configuration for a notification signal, wherein the configuration indicates a set of receive (RX) resources to be used by a corresponding set of nodes, in the multi-hop network, to monitor for the notification signal and a set of transmit (TX) resources to be used by the corresponding set of nodes to transmit the notification signal, wherein the set of RX resources and the set of TX resources are included in a time period during which each node, in the set of nodes, is configured to transmit on a respective TX resource, and/or or receive on any resources other than a respective RX resource, configured for that node, and wherein the notification signal has a shorter symbol duration than a symbol duration used for communications outside of the time period; and
transmitting the notification signal to one or more nodes of the set of nodes.

20. The method of claim 19, wherein the notification signal carries a single bit of information.

21. The method of claim 19, wherein the notification signal indicates at least one of:
a route via which the notification signal is to be transmitted,
an action to be performed in connection with the notification signal,
a time at which the action is to be performed, or
a combination thereof.

22. The method of claim 19, further comprising transmitting, in a message other than the notification signal, at least one of:
routing information that identifies a route via which the notification signal is to be transmitted,
information that identifies an action to be performed in connection with the notification signal,
information that identifies a time at which the action is to be performed, or
a combination thereof.

23. The method of claim 22, wherein the routing information is indicated in a bearer configuration transmitted by the triggering node.

24. The method of claim 19, wherein the notification signal is transmitted based at least in part on reception of an ultra-reliable low latency communication by the triggering node.

25. The method of claim 19, wherein the notification signal is transmitted based at least in part on a determination that a portion of the multi-hop network has failed.

26. A node in a multi-hop network for wireless communication, comprising:
a memory; and
one or more processors operatively coupled to the memory, the memory and the one or more processors configured to:
receive a configuration for a notification signal, wherein the configuration indicates a receive (RX) resource to be used by the node to monitor for the notification signal and a transmit (TX) resource to be used by the node to transmit the notification signal, wherein the RX resource and the TX resource are included in a time period that also includes one or more other RX resources and one or more other TX resources to be used by one or more other nodes in the multi-hop network for the notification signal, and wherein the notification signal has a shorter symbol duration than a symbol duration used for a communication outside of the time period; and
at least one of:
receiving the notification signal in the RX resource, or
transmitting the notification signal in the TX resource.

27. The node of claim 26, wherein the node is further configured to receive the notification signal in the RX resource and transmitting the notification signal in the TX resource.

28. A triggering node in a multi-hop network for wireless communication, comprising:
a memory; and
one or more processors operatively coupled to the memory, the memory and the one or more processors configured to:
transmit a configuration for a notification signal, wherein the configuration indicates a set of receive (RX) resources to be used by a corresponding set of nodes, in the multi-hop network, to monitor for the notification signal and a set of transmit (TX) resources to be used by the corresponding set of nodes to transmit the notification signal, wherein the set of RX resources and the set of TX resources are included in a time period during which each node, in the set of nodes, is configured to transmit on a respective TX resource, and/or receive on a respective RX resource, configured for that node, and wherein the notification signal has a shorter symbol duration than a symbol duration used for communications outside of the time period; and transmit the notification signal to one or more nodes of the set of nodes.

* * * * *